United States Patent [19]

Sauer et al.

[11] 4,254,671

[45] Mar. 10, 1981

[54] METHOD AND SYSTEM FOR UPSHIFTING AN AUTOMATIC TRANSMISSION

[75] Inventors: Joseph Sauer, Schwieberdingen; Volker Kadelbach, Freiberg; Gerhard Will, Weinstadt, all of Fed. Rep. of Germany

[73] Assignee: Robert Bosch GmbH, Stuttgart, Fed. Rep. of Germany

[21] Appl. No.: 882,138

[22] Filed: Feb. 28, 1978

[30] Foreign Application Priority Data

Mar. 3, 1977 [DE] Fed. Rep. of Germany ....... 2709235

[51] Int. Cl.³ .............................................. B60K 41/10
[52] U.S. Cl. .................................. 74/866; 74/752 D
[58] Field of Search .............................. 74/866, 752 D

[56] References Cited

U.S. PATENT DOCUMENTS

| 3,640,156 | 2/1972 | Mori et al. | 74/866 |
| 3,702,572 | 11/1972 | Wakamatsu et al. | 74/866 |
| 3,739,661 | 6/1973 | Harrison | 74/752 D X |
| 3,826,158 | 7/1974 | Flaig | 74/752 D X |
| 3,835,733 | 9/1974 | Wurst | 74/866 |
| 4,073,203 | 2/1978 | Wurst et al. | 74/866 |

FOREIGN PATENT DOCUMENTS 2023877 12/1971 Fed. Rep. of Germany .

Primary Examiner—Rodney H. Bonck
Attorney, Agent, or Firm—Frishauf, Holtz, Goodman & Woodward

[57] ABSTRACT

For automotive vehicles having an engine which has a speed governor which is activated when the engine reaches the maximum permissible engine speed, an AND-gate is supplied which furnishes an upshift signal when the engine speed has reached the maximum permissible speed and when, simultaneously, the pedal is at the full load position or the kickdown switch is activated. The upshift signal is applied to the control circuit for the automatic transmission. It may be combined with a signal signifying vehicle speed in a direction so as to increase the apparent vehicle speed or with a signal indicative of throttle position to indicate an actual lower engine load than present.

5 Claims, 1 Drawing Figure

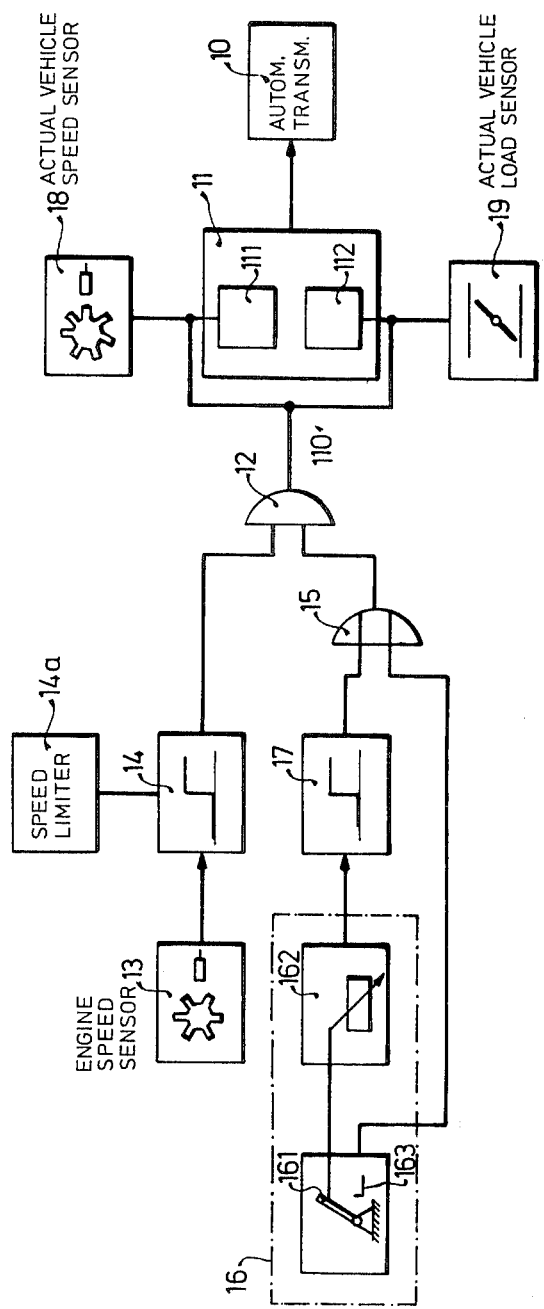

METHOD AND SYSTEM FOR UPSHIFTING AN AUTOMATIC TRANSMISSION

CROSS REFERENCE TO RELATED APPLICATION

Ser. No. 621,513, filed Oct. 10, 1975, Bert WURST et al, now U.S. Pat. No. 4,073,203, assigned to the assignee of the present application, and hereby incorporated by reference into the present application.

The present invention relates to control systems for automatic transmissions. More particularly, it relates to such control systems operating in a vehicle having an engine which has a speed limiting device which automatically decreases the fuel supply when the speed of the engine reaches a predetermined maximum permissible engine speed.

BACKGROUND AND PRIOR ART

In known electronic gear control systems, the up shift into the next higher gear occurs in dependence upon the engine speed, the load, and the vehicle speeds, as plotted along so-called upshift curves. To prevent engine damage, the curve generally specifies an engine speed which is less than the actual maximum permissible speed of the engine, to prevent tolerances in the electronic control from resulting in an excess engine speed and thereby damage to the engine.

A system is disclosed in DT-OS No. 2,023,877 in which the controlled or governed maximum controlled or governed speed at which the upshift occurs is increased when the vehicle accelerates. Thus, for fast acceleration, the speed range actually available in the engine is more fully utilized. The control described in this publication is particularly applicable to engines in which the fuel supply is decreased if the engine speed exceeds the maximum permissible engine speed. It is a disadvantage of this known method that it is only operative when the vehicle accelerates, but not when the pedal is put fully down to the floor board as, for example, may occur when driving up a mountain. Under the latter condition, the acceleration of the vehicle may be so small that the upshift does not occur even though the additional torque which would result from utilization of the full engine speed prior to upshifting is required and the pedal is at full load.

In known systems, if the speed at which the control operates to effect the upshift is too close to the speed at which the speed limiter sets in, it can happen that the fuel supply to the motor is decreased before the control system has had a chance to engage the next higher gear. In the known systems this can happen even though the pedal is at the full-load position or the kickdown switch has been activated. Thus, in spite of the full-load pedal position, in the known systems the gear control will never be able to reach the point at which the upshift occurs. For this reason, the upshift point for the gear control must be at a sufficiently low engine speed that the additive tolerances of the control and of the speed limiter will not prevent an upshift when the pedal is at the full-load position. In the known equipment, the full speed and torque range of the engine is therefore not utilized.

THE INVENTION

It is an object to furnish a system wherein the full speed and torque range of the engine can be utilized. Briefly, in the present invention an upshift signal is created if the full-load signal indicative of desired full load, that is, of the lowest position of the gas pedal, is present simultaneously with the limiting speed signal, that is, the signal indicative of the maximum permissible engine speed. This upshift signal is then applied to the control system for the automatic transmission. The transmission will thus be upshifted by one gear and the decrease in fuel supply which previously prevented such an upshift can no longer take place.

The upshift signal may be applied to control systems already installed in the vehicle. For example, it can be combined with the input signal to the control which signifies vehicle speed. This would take place in a direction to simulate an increased vehicle speed. Similarly, the upshift signal can be added to a signal signifying load in such a direction as to simulate a decreased load.

Drawing, illustrating a preferred embodiment:

The single FIGURE is a block diagram of the preferred embodiment of the invention.

An automatic transmission, 10, cooperates with the drive system of a motor vehicle in known fashion which will not be described here. The shifting of gears in the automatic transmission 10 is controlled by a control circuit 11. Control circuit 11 includes a first measurement stage 111 and a load measurement stage 112. Further, control circuit 11 has an upshift input terminal 110 which is connected to the output of an AND-gate 12. An engine speed sensor 13 is connected through a first threshold switch 14 to the first input of AND-gate 12. The second input of AND-gate 12 is connected to the output of an OR-gate 15. A desired load indicator 16 includes a gas pedal 161 and a position sensor 162 which is mechanically coupled to the gas pedal. A kickdown switch 163 is positioned in the vicinity of the gas pedal. The output of position sensor 162, the desired load signal, is applied to a threshold stage 17 whose output is connected to the first input of OR-gate 15. The second input of OR-gate 15 is directly connected to kickdown switch 163. Also shown in the FIGURE is a vehicle speed sensor 18 whose output is connected to the input of the above described stage 111 and an actual load sensor 19 whose output is connected to the input of the above described stage 112.

Operation: Under normal conditions, the automatic transmission 10 is controlled by the control circuit 11 in accordance with the engine speed, the vehicle speed and the load. In addition, in accordance with the present invention, an upshift command is applied at terminal 110 when both inputs of AND-gate 12 are logic "1" signals. The first input of AND-gate 12 receives a "1" signal when the threshold stage 14 has responded, that is, when the speed of the engine exceeds the speed to which it is to be limited by stage 14a. The second input of AND-gate 12 is a "1" signal when the output of OR-gate 15 is a "1" signal. The output of OR-gate 15 is a "1" signal when the pedal has reached the full-load position, that is, when threshold stage 17 has responded to a signal exceeding its threshold or upon operation of kickdown switch 163. An upshift signal is therefore furnished at the output of AND-gate 12 when the engine speed has reached the maximum permissible engine speed and, simultaneously, the gas pedal has reached a predetermined position, preferably the full-load position. It should be noted that the term "full-load" does not necessarily refer to the most fully activated position of the gas pedal, although in general this will be the case. The full-load position can be any selected predetermind position which will, however, be in the vicinity of the maximum depression of the gas pedal.

In a preferred embodiment, speed sensor 13 is an inductive sensor which cooperates with a gear disk mounted on the cam shaft of the engine. However, the signal at the output of threshold stage 14 can be replaced by any readily available signal indicative of maximum permissible engine speed which is in any case available in the engine or its control system. For example, in Diesel engines having a fuel injection system it is usual to prevent excess engine speed by limiting the fuel supply injected by a fuel injector when a predetermined engine speed has been reached. Therefore, a particular position of the fuel injector (as indicated schematically by stages 14 and 14a of FIG. 1) can also be used as an input signal for the first input of AND-gate 12. The problem of furnishing an upshift signal when the speed limiter device of the engine would otherwise set in and, simultaneously, the position of the gas pedal indicates a desired full load, is thereby satisfied.

The so derived upshift signal can be utilized in any number of ways in cooperation with components already present in the gear control. For example, as shown in the FIGURE, a vehicle speed sensor 18 may already be present. It could correspond, for example, to speed sensor 25 shown in FIGS. 2 and 3 of application Ser. No. 621,513, now U.S. Pat. No. 4,073,203. Addition of the signal furnished by sensor 18 and the upshift signal could take place, for example, by applying both signals to respective inputs of a summing amplifier and applying the output of the summing amplifier to measurement stage 111. Typical values are as follows:

Sensed vehicle speed: 25 km/h, corresponding to 2.5 V; and an upshift signal of 0.5 V. For these conditons the simulated vehicle speed is 30 km/h. At this speed the system will automatically act to upshift transmission 10.

In a similar way, a lower load than is actually present can be simulated by applying the signal from the output of AND-gate 12 and that from sensor 19 to respective inputs of a difference amplifier whose output then is applied to the load measurement stage 112. Again, the value of voltage at the output of gate 12 which constitutes a "1" is so chosen that, when subtracted from the voltage furnished by load sensor 19, a value is obtained at which the control system 11 will cause an upshift in the automatic transmission.

The system of the present invention need not, as stressed several times above, be furnished as a separate entity. It can readily be incorporated into circuits already present in the system. Many components present in any case in an automotive vehicle, as for example mechanical regulators or governors, injection systems, etc. can be utilized to furnish a maximum speed limiting signal and the full-load signal and to process the resultant upshift signal in such a manner that a certain upshift of the automatic transmission results.

Stages 14 and 14a, although illustrated as separate stages for clarity, are, in practice, incorporated in a single stage.

It should also be noted that although switch 163 is commonly called a "kickdown switch" and is so referred to herein, the signal derived from its activation is utilized in the present invention to initiate an upshift rather than a downshift. For the high engine speeds at which the system of the present invention operates a downshift could not occur in any case and operation of the kickdown switch yields the required indication that the gas pedal has been fully depressed.

Various changes and modifications may be made and are to be included in the scope of the invention.

We claim:

1. In automotive vehicles having desired load signal furnishing means (16) for furnishing a desired load signal, and an internal combustion engine having an automatic transmission operative in part in accordance with upshift curves specifying upshift control speeds signifying vehicle speeds requiring upshift, engine speed signal furnishing means (13, 14) operative independently of said automatic transmission for furnishing a limiting speed signal indicative of maximum permissible engine speed, and speed limiting means (14a) for limiting the speed of said engine at least in part under control of said limiting speed signal:

a method for furnishing an upshift signal to said automatic transmission, comprising the steps of furnishing a full-load signal when said desired load signal is indicative of desired full load; and furnishing said upshift signal in response to simultaneous presence of said full-load signal and said limiting speed signal, so that an upshift will occur at full load even when said vehicle speed is less than said upshift control speed.

2. In an automotive vehicle having desired load signal furnishing means (16) for furnishing a desired load signal, means (17) connected to said desired load signal furnishing means for furnishing a full-load signal when said desired load signal is indicative of desired full load, an automatic transmission (10) operative in part in accordance with upshift curves specifying upshift control speeds signifying vehicle speeds requiring upshift, control means (11) for controlling gear shift in said automatic transmission, an engine, engine speed limiting means (14a) operative independently of said automatic transmission for limiting the speed of said engine in response to a limiting speed signal, and engine speed signal furnishing means (13, 14) for furnishing said limiting speed signal when the speed of said engine reaches a maximum permissible engine speed, the improvement comprising upshift signal furnishing means (12) connected to said engine speed signal furnishing means and said desired load signal furnishing means, for furnishing an upshift signal to said automatic transmission in the simultaneous presence of said full-load signal and said limiting speed signal so that an upshift will occur at full load even when said vehicle speed is less than said upshift control speed.

3. System as set forth in claim 2, wherein said engine is a Diesel engine having a fuel injection system; wherein said engine speed signal furnishing means (3) is a part of said fuel injection system; and wherein said limiting speed signal is derived from the position of an injector in said injection system.

4. In an automotive vehicle having desired load signal furnishing means (16) for furnishing a desired load signal, means (17) connected to said desired load signal furnishing means for furnishing a full-load signal when said desired load signal is indicative of desired full load, an automatic transmission (10), control means (11) for controlling gear shift in said automatic transmission, an engine, engine speed limiting means (14a) for limiting the speed of said engine in response to a limiting speed signal, and engine speed signal furnishing means (13, 14) for furnishing said limiting speed signal when the speed of said engine reaches a maximum permissible engine speed, the improvement comprising upshift signal furnishing means (12) connected to said engine speed signal furnishing means and said desired load signal furnishing means, for furnishing an upshift signal to said automatic transmission in the simultaneous presence of said full-load signal and said limiting speed signal;

wherein said automotive vehicle further comprises vehicle speed signal furnishing means (18) furnishing a vehicle speed signal indicative of the speed of said automotive vehicle; wherein said control means comprises first measurement means (111) having an input connected to said vehicle speed signal furnishing means, for furnishing a first measurement signal varying as a function of the speed of said vehicle; wherein said control means further has an upshift input connected to receive said upshift signal; further comprising means for connecting said upshift input to said input of said first measurement means, whereby said first measurement signal varies as a function of said vehicle speed signal and said upshift signal.

5. In an automotive vehicle having desired load signal furnishing means (16) for furnishing a desired load signal, means (17) connected to said desired load signal furnishing means for furnishing a full-load signal when said desired load signal is indicative of desired full load, an automatic transmission (10), control means (11) for controlling gear shift in said automatic transmission, an engine, engine speed limiting means (14a) for limiting the speed of said engine in response to a limiting speed signal, and engine speed signal furnishing means (13, 14) for furnishing said limiting speed signal when the speed of said engine reaches a maximum permissible engine speed, the improvement comprising upshift signal furnishing means (12) connected to said engine speed signal furnishing means and said desired load signal furnishing means, for furnishing an upshift signal to said automatic transmission in the simultaneous presence of said full-load signal and said limiting speed signal;

wherein said automotive vehicle further comprises actual load transducer means (19) for furnishing an actual load signal indicative of the load on said engine; wherein said control means comprises load measurement means (112) having an input connected to said actual load transducer means, for furnishing a load measurement signal corresponding to the load on said engine; wherein said control means further has an upshift input for receiving said upshift signal; further comprising means for connecting said upshift input to said input of said load measurement means, whereby said load measurement signal varies as a function of said actual load signal and said upshift signal.

* * * * *